March 2, 1954    G. E. CAMPBELL    2,670,537
LAWN SPRINKLER HEAD CLEANER
Filed Jan. 23, 1950
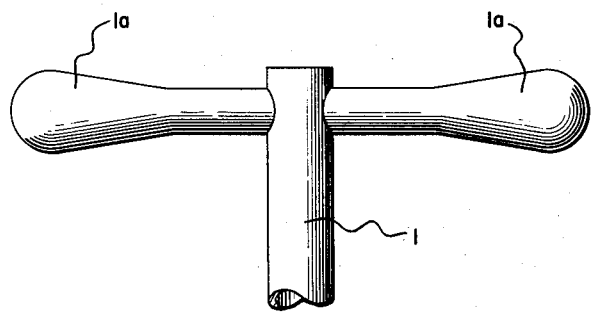
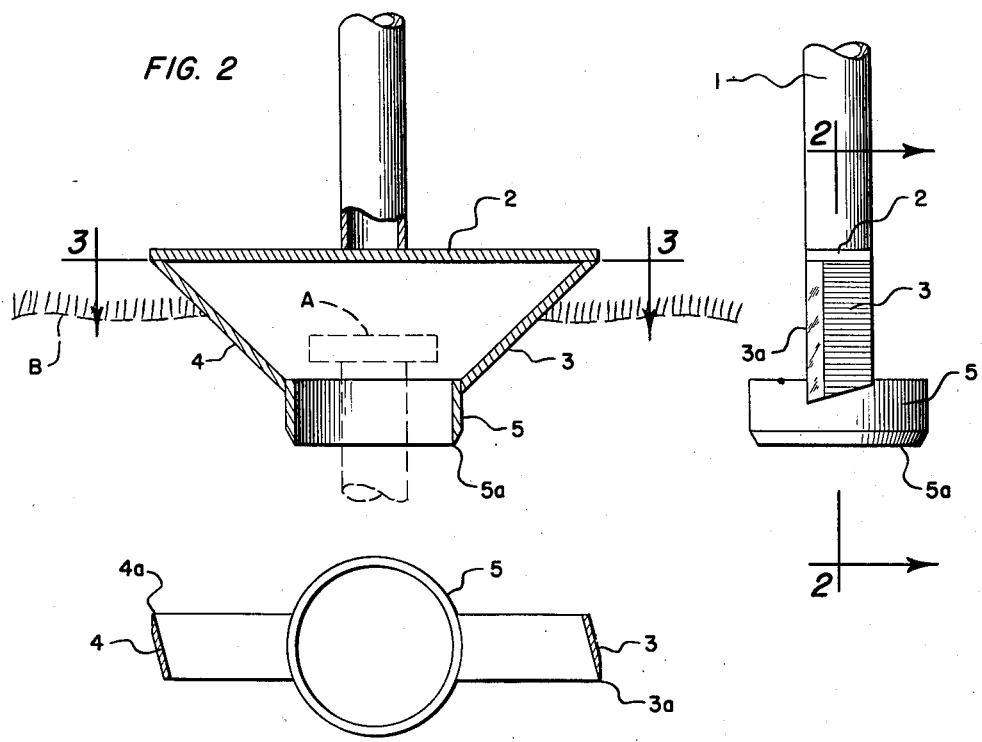
INVENTOR.
GEORGE E. CAMPBELL
BY
*Wm. H. Dean*
AGENT Patented Mar. 2, 1954

2,670,537

UNITED STATES PATENT OFFICE 2,670,537

LAWN SPRINKLER HEAD CLEANER

George E. Campbell, San Diego, Calif.

Application January 23, 1950, Serial No. 140,100

2 Claims. (Cl. 30—300)

My invention relates to a lawn sprinkler head cleaner, more particularly for use in cutting away grass and sod adjacent to recessed lawn sprinkler heads in lawns or the like, whereby the spray emitted by said sprinkler heads may spread in the normal manner, and the objects of my invention are:

First, to provide a lawn sprinkler head cleaner of this class which is arranged to concurrently surround a sprinkler head and cut off grass adjacent thereto, while providing a downwardly converging cut away portion in the sod surrounding the sprinkler head in order to permit free passage of the spray from the sprinkler head outwardly and upwardly;

Second, to provide a lawn sprinkler head cleaner of this class which is very simple and easy to operate, requiring only slight vertical pressure and torsional force on the handle thereof while the operator is standing in upright position;

Third, to provide a lawn sprinkler head cleaner of this class which is of unitary integral construction, and which is very precise in its operation, providing a very neat and uniform recess in the sod surrounding a conventional recessed sprinkler head;

Fourth, to provide a lawn sprinkler head cleaner of this class in which the sod cut away around the sprinkler head does not hamper further recessing of the sod around the sprinkler head if desired;

Fifth, to provide a lawn sprinkler head cleaner of this class which may be rotated first in a clockwise direction and then in a counterclockwise direction in order to provide an inverted frusto-conical recess surrounding sprinkler heads; and Sixth, to provide a lawn sprinkler head cleaner of this class which is very simple and economical of construction, efficient in operation, and which will not readily deteriorate or get out of order.

With these and other objects in view, as will appear hereinafter, my invention consists of certain novel features of construction, combination and arrangement of parts and portions, as will be hereinafter described in detail and particularly set forth in the appended claims, reference being had to the accompanying drawings and to the characters of reference thereon, forming a part of this application, in which:

Fig. 1 is a fragmentary side elevational view of my lawn sprinkler head cleaner; Fig. 2 is a fragmentary sectional view, taken from the line 2—2 of Fig. 1, showing the handle in connection therewith; and Fig. 3 is a plan sectional view, taken from the line 3—3 of Fig. 2.

Similar characters of reference refer to similar parts and portions throughout the several views of the drawings.

In the construction of my lawn sprinkler head cleaner, I have provided a handle shank 1, which is preferably tubular and provided with a pair of opposed handle arm portions 1a at the normally upper end thereof when in operation. Fixed to the lower end of this handle shank 1 is a cross-bar 2, having downwardly converging blades 3 and 4, secured thereto. The lower ends of these blades 3 and 4 are fixed to a cylindrical cutter 5, having a sharp cutting edge 5a at its lower end. It will be noted that the blades 3 and 4 are provided with sharp cutting edges 3a and 4a, which are adapted to cut sod in the ground surrounding a sprinkler head, as illustrated by dash lines A in Fig. 2 of the drawings.

The operation of my lawn sprinkler head cleaner is substantially as follows:

When it is desired to clean recessed sprinkler heads, which are overgrown with sod and grass, the cylindrical cutter 5 is placed on the ground surrounding the sprinkler head A and is forced downwardly by means of the handle arm 1a. The shank is rotated by means of the handle arms 1a and the sharp edges 3a and 4a of the blades 3 and 4 cut the sod surrounding the sprinkler head into a substantially frusto-conical recess, which clears away all of the sod which has overgrown the sprinkler head A. It will be noted that the cutting edge 5a of the cylindrical cutter 5 shears off grass directly positioned about the sprinkler head A, and provides a concentric bearing for the operation of the blades 3 and 4. It will be noted that the upper surface of the ground B on which the grass grows may be cut back a considerable distance from the sprinkler head A by means of the blades 3 and 4, so that the spray emitted from the sprinkler head A at an angle which is directed upwardly and outwardly therefrom easily clears the grass at the upper surface B of the ground.

Though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent is:

1. A sod cutter comprising a vertically disposed handle, a cross-arm on said handle at the upper end thereof and a cross-bar on the handle at the lower end, a pair of inclined flat cutters sharpened on the inclined leading edges and downwardly converging toward the projected axis of the handle in a direction away from said cross-bar, a cylindrical cutter sharpened at one end and connected between the convergent flat ends of said cutters at the other end, whereby a cylindrical cut is made to permit entry of said converging cutters which form a frusto-conically shaped recess in the sod.

2. In a sod cutter, a handle shank, cross arms secured to one end of said shank, a cross bar centrally secured to the other end of said shank, a pair of flat cutters secured to the opposite outer ends of said cross bar, said cutters being inclined relative to said cross bar and converging toward each other away from said shank and converging toward the projected axis of said shank, said inclined cutters having sharpened leading edges, a hollow cylindrical cutter having the end thereof adjacent the shank secured to and between the convergent ends of the cutters, and said cylindrical cutter being sharpened on the opposite end thereof, whereby upon rotation of said handle shank said cylindrical cutter will lead into the ground and said inclined cutters will form a frusto-conical recess in the sod.

GEORGE E. CAMPBELL.

References Cited in the file of this patent

UNITED STATES PATENTS

| Number | Name | Date |
|---|---|---|
| 1,480,151 | Cosman | Jan. 8, 1924 |
| 1,765,288 | Schmidt | June 17, 1930 |
| 1,866,073 | Aberle | July 5, 1932 |

FOREIGN PATENTS

| Number | Country | Date |
|---|---|---|
| 288,014 | Great Britain | Apr. 5, 1928 |